United States Patent
Nakata

(10) Patent No.: US 7,511,408 B2
(45) Date of Patent: Mar. 31, 2009

(54) SPACER FOR IMAGE DISPLAY APPARATUS AND IMAGE DISPLAY APPARATUS

(75) Inventor: Kohei Nakata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 11/222,850

(22) Filed: Sep. 12, 2005

(65) Prior Publication Data

US 2006/0055301 A1 Mar. 16, 2006

(30) Foreign Application Priority Data

Sep. 16, 2004 (JP) .............................. 2004-269957

(51) Int. Cl.
*H01J 19/42* (2006.01)

(52) U.S. Cl. ...................... 313/292; 313/495

(58) Field of Classification Search ................ 313/292, 313/493, 495, 634, 238; 501/69, 77
See application file for complete search history.

(56) References Cited

U.S. PATENT DOCUMENTS

| | | | |
|---|---|---|---|
| 3,189,471 A * | 6/1965 | Thomas ........................ 501/35 |
| 4,367,012 A * | 1/1983 | Ikeda et al. .................. 385/144 |
| 5,525,861 A | 6/1996 | Banno et al. ................. 313/495 |
| 5,925,979 A | 7/1999 | Azuma et al. ................ 313/495 |
| 6,486,600 B1 | 11/2002 | Azuma et al. ................ 313/496 |
| 6,546,753 B2 * | 4/2003 | Naka et al. ................. 65/134.3 |
| 6,586,867 B2 | 7/2003 | Morishita et al. ........... 313/292 |
| 6,726,520 B2 | 4/2004 | Takeda et al. ................. 445/62 |
| 6,908,354 B1 | 6/2005 | Nakata ......................... 445/24 |
| 2001/0036682 A1 | 11/2001 | Takeda et al. ................. 438/34 |
| 2002/0060513 A1 | 5/2002 | Morishita et al. ........... 313/292 |

FOREIGN PATENT DOCUMENTS

| | | |
|---|---|---|
| JP | 2000-251648 | 9/2000 |
| JP | 2000-311594 | 11/2000 |
| JP | 2002-104839 | 4/2002 |
| JP | 2002104839 * | 4/2002 |

* cited by examiner

*Primary Examiner*—Bao Q Truong
(74) *Attorney, Agent, or Firm*—Fitzpatrick, Cella, Harper & Scinto

(57) ABSTRACT

A spacer for an image display apparatus includes a glass base member which contains $SiO_2$ by 10 to 35 wt %, RO (R representing an alkali earth metal) by 20 to 60 wt %, $B_2O_3$ by 9 to 30 wt % and $Sb_2O_3$ by 0.01 to 5 wt %.

8 Claims, 4 Drawing Sheets

SPACER FOR IMAGE DISPLAY APPARATUS AND IMAGE DISPLAY APPARATUS

BACKGROUND OF THE INVENTION

1. Field of the Invention

The present invention relates to a spacer to be used for maintaining a hermetically sealed space, and more particularly to a spacer provided in a hermetically sealed container.

2. Related Background Art

For image display there are known various image display apparatuses such as an electron beam excited display, a plasma display, a liquid crystal display and an EL display, and developments are being actively made toward a larger display image size. In such image display apparatus, a larger display image size requires a higher strength in a hermetically sealed container constituting an envelope of the image display apparatus, As an example of such spacer, Japanese Patent Application Laid-open No. 2002-104839 discloses a spacer having a linear thermal expansion coefficient equivalent to that of soda lime silicate glass commonly employed in a face plate and a rear plate constituting a hermetically sealed container of an electron beam-excited display and still constituted of alkali-free glass. More specifically, it describes that a spacer constituted of alkali-free glass of a glass composition containing $SiO_2$ by 10 to 35 wt %, RO (R representing an alkali earth metal) by 20 to 60 wt %, $B_2O_3$ by 9 to 30 wt % and $Al_2O_3$ by 0 to 10 wt % and substantially free from an alkali metal, employed as a spacer of the electron beam-excited display, can avoid a failure such as an electric field breakdown induced by an alkali component, and also is free from a destruction resulting from a difference in the linear expansion, since such spacer has a linear expansion coefficient equivalent to that of the soda lime silicate glass.

However, a spacer constituted of the glass of the aforementioned composition may include a bubble, that may deteriorate characteristics required for the spacer, such as a mechanical strength.

SUMMARY OF THE INVENTION

An object of the present invention is to provide a spacer of a sufficient strength for use in an image display apparatus, and an image display apparatus equipped with such spacer.

According to the present invention, there is provided a spacer for an image display apparatus, characterized in including a glass base material containing $SiO_2$ by 10 to 35 wt %, RO (R representing an alkali earth metal) by 20 to 60 wt %, $B_2O_3$ by 9 to 30 wt % and $Sb_2O_3$ by 0.01 to 5 wt %.

According to the present invention, there is also provided an image display apparatus including, in a hermetically sealed container, an image display member, and a spacer for supporting a hermetically sealed space in the hermetically sealed container, wherein the spacer includes a glass base material containing $SiO_2$ by 10 to 35 wt %, RO (R representing an alkali earth metal) by 20 to 60 wt %, $B_2O_3$ by 9 to 30 wt % and $Sb_2O_3$ by 0.01 to 5 wt %.

DETAILED DESCRIPTION OF THE PREFERRED EMBODIMENTS

Figure 1:
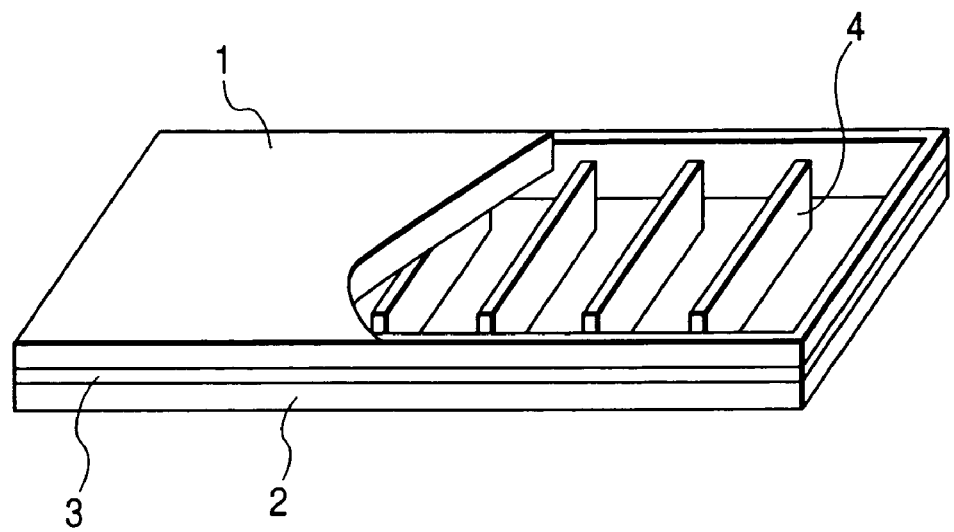
FIG. 1 is a partially cut-off perspective view of a spacer of the present invention, applied to an image display apparatus.

The present invention provides a spacer for an image display apparatus, characterized in including a glass base material containing $SiO_2$ by 10 to 35 wt %, RO (R representing an alkali earth metal) by 20 to 60 wt %, $B_2O_3$ by 9 to 30 wt % and $Sb_2O_3$ by 0.01 to 5 wt %.

The present invention also provides an image display apparatus including, in a hermetically sealed container, an image display member, and a spacer for supporting a hermetically sealed space in the hermetically sealed container, wherein the spacer is an aforementioned spacer.

According to the present invention, there can be provided a spacer of a sufficient strength for an image display apparatus, and an image display apparatus equipped with such spacer.

In the following there will be explained the spacer of the present invention and the image display apparatus provided with such spacer.

The spacer of the present invention for the image display apparatus includes an insulating spacer formed by a glass base member, and an electroconductive spacer having a resistor or a resistive film on a surface of a glass base member.

The spacer of the present invention for the image display apparatus has a glass base member which contains $SiO_2$ by 10 to 35 wt %, RO (R representing an alkali earth metal) by 20 to 60 wt %, $B_2O_3$ by 9 to 30 wt % and $Sb_2O_3$ by 0.01 to 5 wt %.

$SiO_2$ is an essential component for forming a glass skeleton, and a glass becomes difficult to form with a content less than 10 wt %, while the content is preferably 35 wt % or less since an excessively high content elevates a fusing temperature of the glass, eventually rendering a manufacture in an ordinary fusing furnace difficult.

RO, namely one or more alkali earth metal oxides such as BaO, CaO, MgO or SrO, is employed for improving a durability of the glass and regulating a viscosity thereof, and is preferably contained by 20 wt % or more. Also a content of 60 wt % or less is preferable because an excessively high content lowers a glass transition point to deteriorate a thermal durability and may hinder a glass formation at the glass fusing.

$B_2O_3$ is a component employed for improving a durability of the glass or as a dissolution promoter, and is preferably contained by 9 wt % or more, but is preferably contained by 30 wt % or less because an excessively high content lowers a glass transition point to deteriorate a thermal durability or a chemical resistance.

$Al_2O_3$, not an essential component in the glass base member of the present invention, is used for improving the durability of the glass, and is preferably contained by 0.01 wt % or higher. It is preferably contained by 10 wt % or less, since an excessively high content elevates a fusing temperature of the glass, eventually rendering a manufacture in an ordinary fusing furnace difficult and may induce a devitrification.

The spacer of the present invention for the image display apparatus preferably includes further any of $La_2O_3$, $ZnO_2$ and $TiO_2$. In such case it is particularly preferred that $La_2O_3$ is contained by 30 wt % or less, $ZnO_2$ is contained by 8 wt % or less and $TiO_2$ is contained by 5 wt % or less.

$Sb_2O_3$ is a component particularly featuring the present invention.

For example the prior glass base member for the spacer of the image display apparatus disclosed in the aforementioned Japanese Patent Application Laid-open No. 2002-104839 may include a bubble because of absence of $Sb_2O_3$, and such bubble may deteriorate a performance required for the spacer such as strength.

The spacer is positioned in a hermetically sealed container constituting an envelope of the image display apparatus, for the purpose of maintaining a hermetically sealed space therein by supporting such hermetically sealed space from the inside of the hermetically sealed container.

Particularly in case a bubble of a diameter of 30 μm or larger is present in the vicinity of a contact portion of the spacer with the hermetically sealed container, a crack may be generated in the glass base member from the position of such bubble, thereby reducing the strength required in the spacer.

Also the spacer may be subjected, on a surface thereof, to a desired fine working. In particular, fine concave and convex portions of a depth and a pitch in the order of several micrometers to several tens of micrometers may be formed for the purpose of suppressing a secondary electron emission from the spacer surface, and a bubble of a diameter of 30 μm or larger, if present in the glass base member of the spacer, may result in a formation of an unnecessary hole at the formation of the concave and convex portions thereby hindering the formation of the desired concave and convex patterns.

Therefore the glass base member of the spacer of the invention for the image display apparatus, by containing $Sb_2O_3$ by 0.01 wt % or more, minimizes the presence of a bubble having a diameter of 30 μm or larger, and can attain a desired spacer strength and a desired surface shape.

$Sb_2O_3$ is preferably contained in an amount of 5 wt % or less because a content exceeding 5 wt % does not increase the bubble preventing effect and an excessively high content may lower a glass transition point thereby deteriorating a thermal durability, and, particularly preferably $Sb_2O_3$ is contained by 0.1 to 2 wt %.

The spacer of the present invention for the image display apparatus is not particularly restricted in a producing method, and can be suitably produced by already known methods.

More specifically, a glass base member of a desired shape can be obtained by cutting out a glass base member of a specified dimension from a glass material having a composition of the invention, or by extending a glass material having a composition of the invention under heating to a temperature at which such glass material is capable of deformation by softening and cutting thus extended glass material into a specified length.

Also the spacer of the present invention for the image display apparatus is not particularly restricted in shape and may assume, for example, a plate shape, a cylindrical shape or a spherical shape, that can be suitably selected according to a requirement in an applicable image display apparatus.

Also the spacer of the present invention for the image display apparatus is suitably selected in a size, a number of arrangement and a pitch of arrangement according to a requirement in the applicable image display apparatus so as to sufficiently maintain the aforementioned hermetically sealed space, and, as to the size, it preferably has a thickness within a range of 0.05 to 3 mm and a height within a range of 1 to 5 mm.

FIG. 1 is a partially cut-off schematic perspective view of a spacer of the present invention, applied to an image display apparatus.

Referring to FIG. 1, a face plate 1 constituting an image display side is provided, on an internal surface thereof, with a color filter and the like in case of a liquid crystal display or a plasma display, or an anode electrode and a phosphor in case of an electron beam-excited display. Also a rear plate 2 is provided thereon with an electron source in case of an electron beam-excited display, or an EL element in case of an EL display.

Referring to FIG. 1, the face plate 1 and the rear plate 2 are sealed by a sealing member 3 to form a hermetically sealed space therein. The hermetically sealed space is maintained at a reduced pressure of $10^{-4}$ to $10^{-6}$ Pa in case of an electron beam-excited display, or contains an exciting gas in case of a plasma display or a liquid crystal compound in case of a liquid crystal display.

Referring to FIG. 1, a spacer 4 of the present invention includes a glass base member of the aforementioned glass composition, and is provided in a hermetically sealed container, constituted of the face plate 1, the rear plate 2 and the sealing member 3, for the purpose of maintaining a hermetically sealed space therein, thereby supporting a hermetically sealed space in such hermetically sealed container.

The image display apparatus shown in FIG. 1 is provided with the spacer 4 of the present invention, and therefore includes a hermetically sealed space which is satisfactorily supported particularly in terms of strength.

EXAMPLES

In the following, the present invention will be clarified further by Examples and Comparative Examples.

Examples 1 to 6, Comparative Examples 1 and 2

Glass materials (A to H) of compositions shown in Table 1 were prepared.

TABLE 1

| glass material composition | A | B | C | D | E | F | G | H |
|---|---|---|---|---|---|---|---|---|
| $SiO_2$ | 32.1 | 34.5 | 28.0 | 28.0 | 25.8 | 39.8 | 33.0 | 30.8 |
| CaO | 16.9 | 22.0 | 0.0 | 0.0 | 0.0 | 0.0 | 0.0 | 0.0 |
| BaO | 22.7 | 16.8 | 34.0 | 34.0 | 49.0 | 49.0 | 47.4 | 48.6 |
| MgO | 0.0 | 1.0 | 0.0 | 0.0 | 0.0 | 0.0 | 0.0 | 0.0 |
| SrO | 0.0 | 1.0 | 5.0 | 5.0 | 5.0 | 0.0 | 0.0 | 0.0 |
| $B_2O_3$ | 11.0 | 4.9 | 1.0 | 1.0 | 1.0 | 1.4 | 5.7 | 5.2 |
| $Al_2O_3$ | 6.4 | 7.8 | 6.0 | 7.0 | 4.5 | 0.0 | 0.0 | 0.0 |
| $La_2O3$ | 8.7 | 0.0 | 1.0 | 1.0 | 0.0 | 0.0 | 1.2 | 2.5 |
| $ZnO_2$ | 1.2 | 1.0 | 0.0 | 0.0 | 0.0 | 0.0 | 0.0 | 0.0 |
| $TiO_2$ | 0.0 | 1.0 | 0.0 | 0.0 | 0.0 | 0.0 | 0.0 | 0.0 |
| $ZrO_2$ | 1.0 | 0.0 | 0.0 | 0.0 | 0.0 | 0.0 | 0.0 | 0.0 |
| $Sb_2O_3$ | 0.2 | 1.0 | 4.0 | 0.0 | 8.0 | 1.0 | 1.0 | 0.5 |

Figure 2:
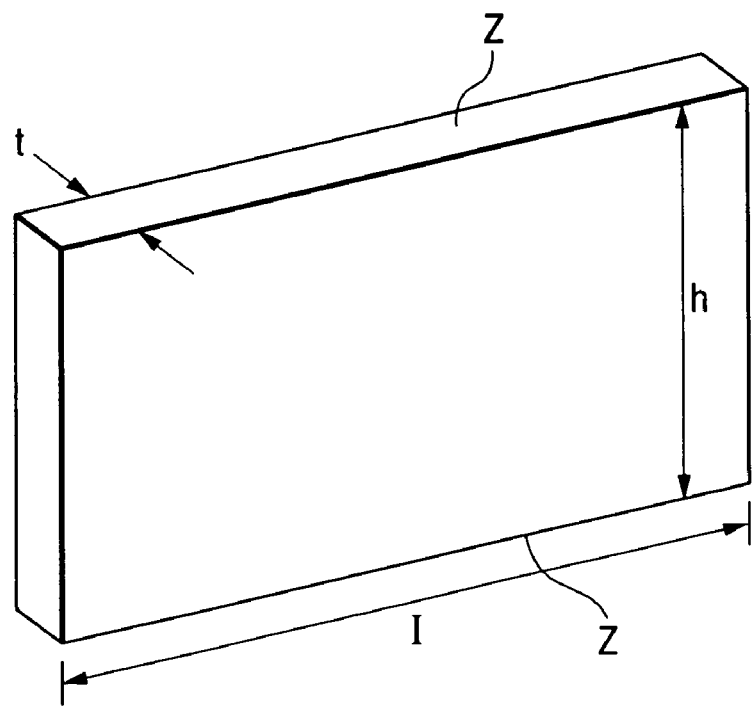
FIG. 2 is a schematic perspective view showing an example of a glass base member.

Each of the glass materials A to H of the aforementioned compositions was extended under heating to 760° C. and cut into a predetermined length to obtain a glass base member of a thickness t of 0.2 mm, a height h of 1.6 mm and a length l of 825 mm as shown in FIG. 2, in plural units for each glass material.

All thus prepared glass base members were inspected for presence/absence of bubble and a glass transition point. The presence/absence of bubble was inspected by an observation under a transmission optical microscope, and there were measured presence/absence of bubble, a diameter of the bubble and a number of bubbles per unit volume (L: liter).

Also a glass transition point Tg was measured by a thermomechanical analysis. A member having a glass transition point lower than 600° C. was judged as unacceptable, because of a poor resistance (thermal resistance) to a thermal process in the manufacturing procedure of an image display apparatus.

These results are shown in Table 2.

TABLE 2

| | glass mat. A Ex. 1 | glass mat. B Ex. 2 | glass mat. C Ex. 3 | glass mat. D Comp. 1 | glass mat. E Comp. 2 | glass mat. F Ex. 4 | glass mat. G Ex. 5 | glass mat. H Ex. 6 |
|---|---|---|---|---|---|---|---|---|
| presence/absence of bubble | absent (*1) | absent | absent | present (*2) | absent | absent | absent | absent |
| heat resistance Tg | AA | AA | A | AA | C | AA | AA | AA |

(*1): Presence of a bubble of 1 µm or larger was not confirmed in any of plural glass base members.
(*2): Bubbles of 30 µm or larger were present by 10 or more per 1 L in any of plural glass base members.

As will be apparent from the results shown in Table 2, in the evaluation of presence/absence of bubbles, the glass base members of Examples 1 to 6 for the space of the invention for the image display apparatus and that of Comparative Example 2 did not show a bubble of a diameter of 1 µm or larger, which is a limit of the aforementioned measurement. On the other hand, the glass base member of Comparative Example 1 showed many bubbles of a diameter of 30 µm or larger, on an end face Z of the glass base member shown in FIG. 2.

Also in the evaluation of heat resistance, Examples 1, 2, 4 to 6 and Comparative Example 1 had satisfactory heat transition points, and Example 3 had a heat transition point slightly exceeding 600° C. On the other hand, Comparative Example 2 had a glass transition point lower than 600° C.

Figure 3:
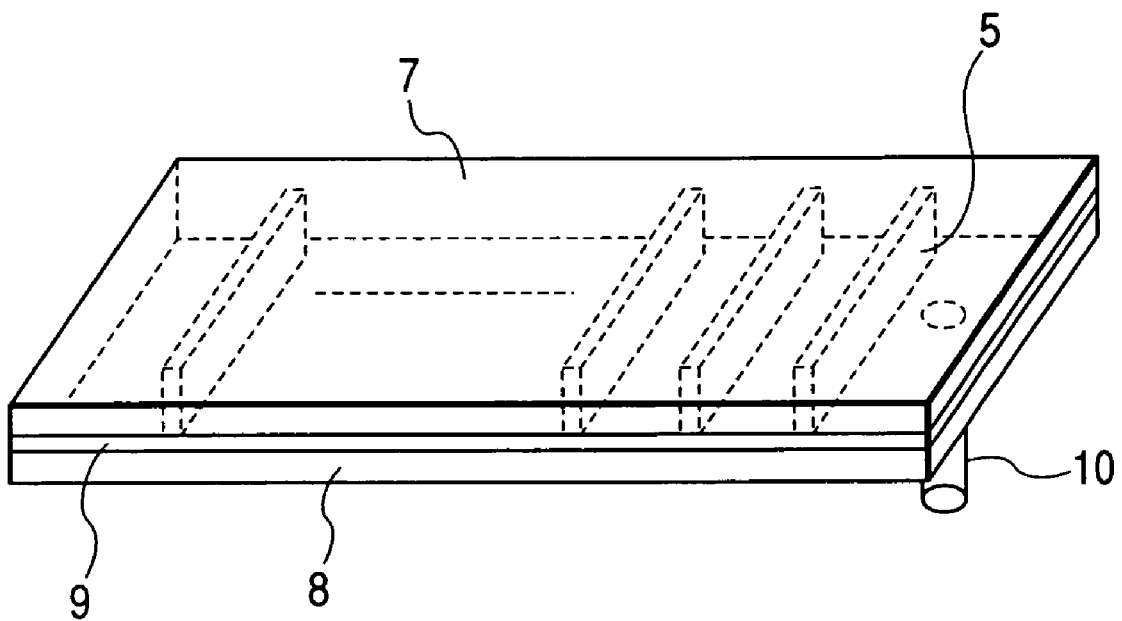
FIG. 3 is a perspective view for explaining a strength testing method for the glass base member.

20 glass base members 5 of each of Examples and Comparative Examples shown in Table 2 were placed as shown in FIG. 3, as explained in the following.

At first, on a second plate 8 formed by a soda lime glass of a thickness of 2.8 mm and an area of 580×900 mm, the aforementioned 20 glass base members 5 were positioned at equal distances. The glass base member 5 was positioned by fixing both ends thereof in a longitudinal direction, with a frit glass, to the second plate 8.

Then, on the second plate 8, an outer frame 9 constituted of a soda lime glass of a thickness of 1.4 mm and a width of 8 mm was fixed with a frit glass.

Then a first plate 7 of a soda lime glass of a thickness of 2.8 mm and an area of 580×900 mm was fixed and sealed with a frit glass on the outer frame 9. The sealing temperature was 450° C.

In order to verify a strength of the glass base member of each of Examples and Comparative Examples shown in Table 2 as a spacer, the interior of the hermetically sealed container constituted by the first and second plates 7, 8 and the outer frame 9 was evacuated through an exhaust pipe 10 to a reduced pressure of $10^{-4}$ Pa. Thereafter the interior of the hermetically sealed container was returned to the atmospheric pressure, then the first plate 7 and the glass base members 5 were separated, and a contact face (corresponding to Z in FIG. 2) of each glass base member in contact with the first and second plates 7, 8 was observed under an optical microscope.

In the contact face, a chipping or a fissure was not observed in the glass base members of Examples 1 to 6 and Comparative Example 2, but the glass base member of Comparative Example 1 showed fissures and chippings.

Also the glass base members of Examples 1 to 6 and Comparative Example 2 were satisfactory in heat resistance and did not show a deformation, while the glass base member of Comparative Example 1 shows a poor heat resistance to the thermal process in the manufacturing procedure and showed a partial deformation.

Example 7

In the following there will be shown an example of an image display apparatus provided with a spacer utilizing the glass base members of Examples 1 to 6.

On a surface of the glass base member of each of Examples 1 to 6, a resistive film was formed in a following method. The resistive film preferably has a sheet resistance of $10^{10}$ to $10^{14}$ Ω/sq, and a material to be employed can be suitably selected from metals and semiconductors adequate for obtaining a desired sheet resistance.

On a surface of the glass base member of each example, a W—Ge—N resistive film as an antistatic resistive film was formed with a thickness of 200 nm by a simultaneous sputtering from a W target and a Ge target. A gaseous mixture of $Ar:N_2=1:2$ was employed as a sputtering gas, with a total pressure of 1 mTorr. The resistive film formed under these conditions had a sheet resistance of $1×10^{11}$ Ω/sq.

Also on end faces (corresponding to Z in FIG. 2) to be contacted with a face plate and a rear plate to be explained later, there was formed a resistive film of a lower resistance than that mentioned above. In an area of the end face, a Ti film of a thickness of 10 nm and a Pt film of a thickness of 200 nm were formed in a stripe shape of 200 µm, in gaseous phase by a sputtering. The Ti film was an undercoat layer for reinforcing an adhesion of the Pt film. In this manner a spacer further equipped with a low resistive film was obtained. The low resistive film had a thickness of 210 nm and a sheet resistance of 10 Ω/sq.

Figure 4:
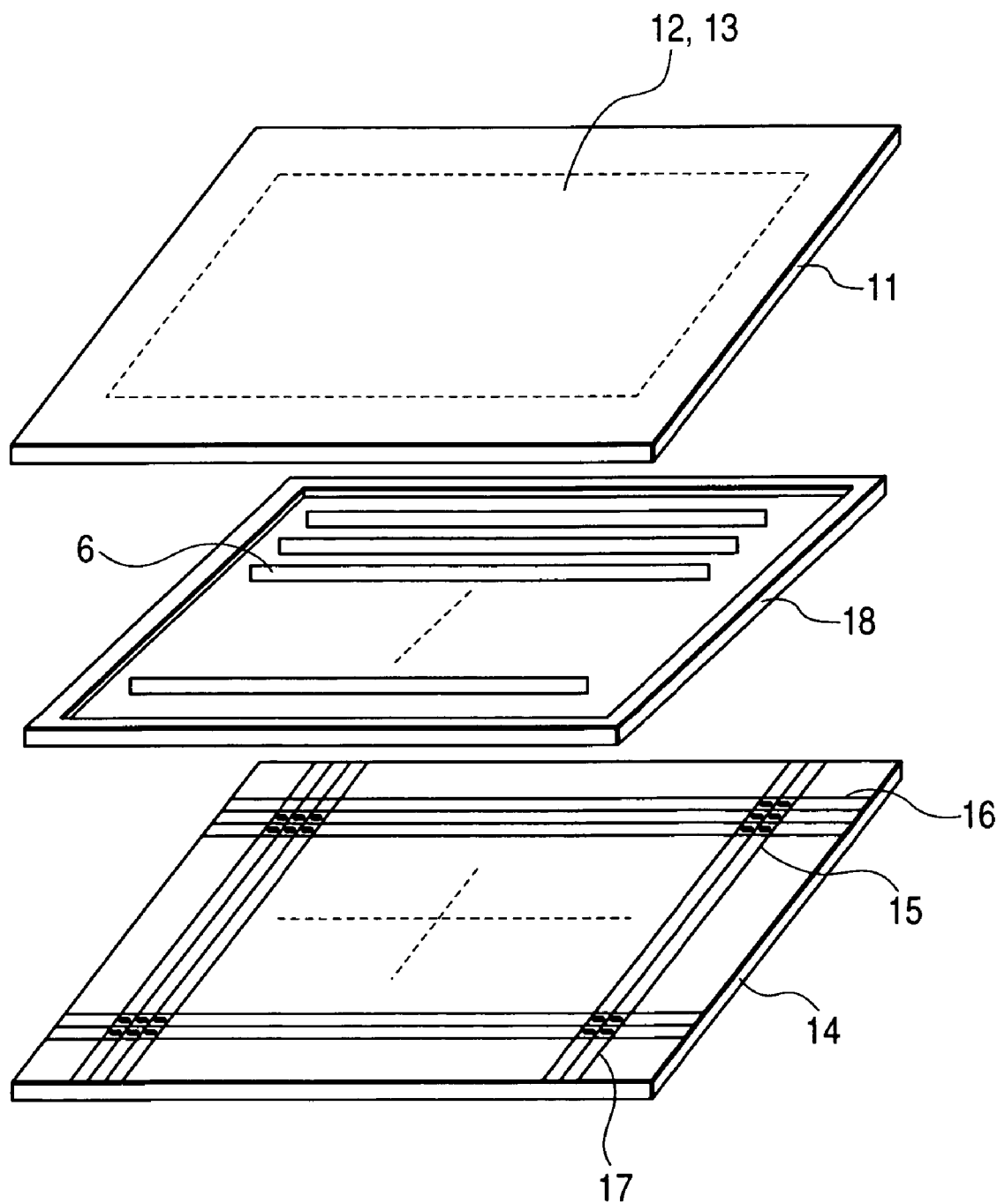
FIG. 4 is a schematic exploded perspective view of a spacer of the present invention applied to an image display apparatus.

The spacer thus prepared was positioned in a hermetically sealed container constituting an envelope of an image display apparatus as shown in FIG. 4, which is illustrated in an exploded perspective view for clarifying the internal structure.

In FIG. 4, a face plate 11 is provided on an internal surface thereof with a phosphor film 12 and a metal back 13.

Also in FIG. 4, a rear plate 14 is provided on an internal surface thereof with an electron source, constituted of plural electron emitting devices 15 which are connected in a matrix wiring by plural row wirings 16 and plural column wirings 17. A part of the electron emitting device 15, row wirings 16 and column wirings 17 is omitted for the purpose of simplicity.

Also in FIG. 4, an outer frame 18 constitutes, together with the face plate 11 and the rear plate 14, a hermetically sealed container of which interior is maintained at a reduced pressure of about $10^{-4}$ Pa, and plural spacers 6 are positioned in such hermetically sealed container in order to maintain a distance between the face plate 11 and the rear plate 14. A part of the spacers 6 is omitted for the purpose of simplicity.

The electron source can be produced by a known method described for example in Japanese Patent Application Laid-open No. 2000-311594, and the installation of the spacers in the hermetically sealed container can be executed by a known method described for example in Japanese Patent Application Laid-open No. 2000-251648.

The image display apparatus prepared in the aforementioned example could maintain sufficiently the distance between the face plate 11 and the rear plate 14, and no tumbling nor deformation of the spacer was observed. Also no influence of the spacer on the electron flight from the electron source could be observed.

Example 8

Figure 5:
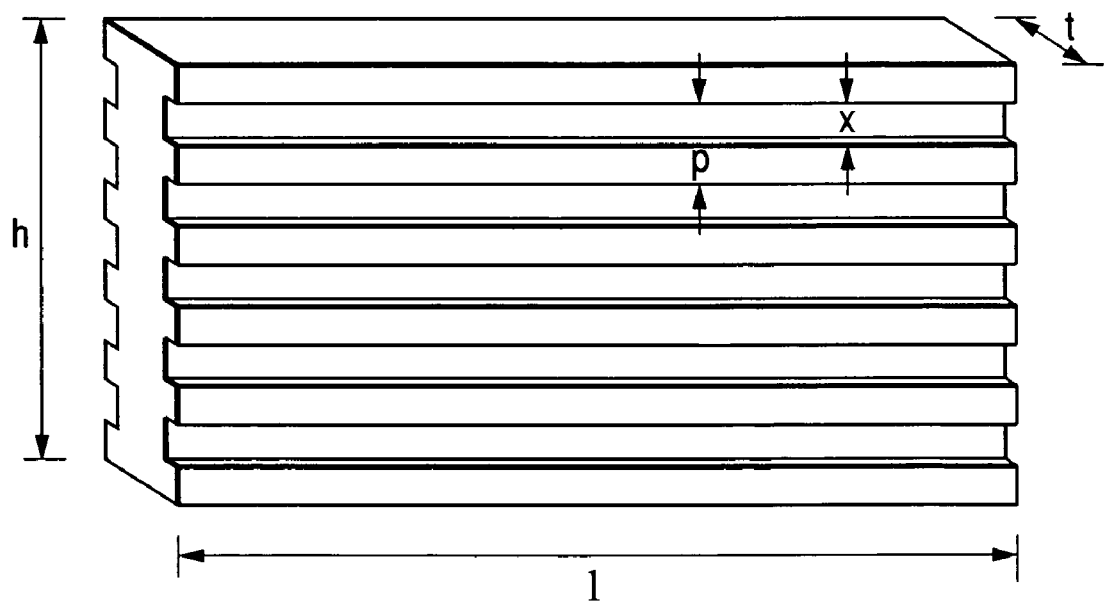
FIG. 5 is a schematic perspective view showing a glass base member in which striped grooves are formed.

In the present example, a glass base member having striped grooves as shown in FIG. 5 was prepared.

In each of the glass materials of the compositions shown in Table 1, plural striped grooves were formed by a grinding working. Such glass material was extended in a direction of the grooves under a heating at 760° C. and was cut into a predetermined length to obtain a glass base member with a thickness t of 0.2 mm, a height h of 1.6 mm, a length l of 850 mm, a groove depth of 8 μm, a groove width x of 15 μm and a groove pitch p of 30 μm as shown in FIG. 5 was prepared in plural units for each glass material.

All thus prepared glass base members were inspected for presence/absence of bubble, particularly in a convex portion between the grooves. The inspection was conducted in the same manner as in Table 2.

As a result of inspection, the glass base member prepared with the glass material D showed a chipping in the convex portion, but the glass base members prepared with the glass materials A to C and E to H did not show a chipping nor a bubble.

Thus prepared glass base member was subjected to formations of a resistive film and a low resistive film as in Example 7 to obtain a spacer, which was employed for preparing an image display apparatus as shown in FIG. 4, in a same manner as in Example 7.

The image display apparatus prepared in the this example could maintain sufficiently the distance between the face plate 11 and the rear plate 14, and no tumbling nor deformation of the spacer was observed. Also no influence of the spacer on the electron flight from the electron source could be observed.

This application claims priority from Japanese Patent Application No. 2004-269957 filed on Sep. 16, 2004, which is hereby incorporated by reference herein.

What is claimed is:

1. A spacer for an image display apparatus comprising a glass base member which contains $SiO_2$ by 10 to 35 wt %, RO, with R representing an alkali earth metal, by 20 to 60 wt %, $B_2O_3$ by 9 to 30 wt % and $Sb_2O_3$ by 0.01 to 5 wt %, wherein a total sum of wt % of $SiO_2$ and wt % of $Sb_2O_3$ does not exceed 36 wt %, and the total wt % of the glass base member does not exceed 100%.

2. The spacer for an image display apparatus according to claim 1, wherein the glass base member further contains $Al_2O_3$ by 0.01 to 10 wt %.

3. The spacer for an image display apparatus according to claim 1, wherein $Sb_2O_3$ is contained in an amount of 0.01 to 2 wt %.

4. The spacer for an image display apparatus according to claim 1, wherein the glass base member has convex and concave shapes on a surface thereof.

5. An image display apparatus comprising a hermetically sealed container, an image display member and a spacer for maintaining, in the hermetically sealed container, a hermetically sealed space in which the image display member is disposed, where the spacer having a glass base member which contains $SiO_2$ by 10 to 35 wt %, RO, with R representing an alkali earth metal, by 20 to 60 wt %, $B_2O_3$ by 9 to 30 wt % and $Sb_2O_3$ by 0.01 to 5 wt %, wherein a total sum of wt % of $SiO_2$ and wt % of $Sb_2O_3$ does not exceed 36 wt %. and the total wt % of the glass base member does not exceed 100%.

6. The image display apparatus according to claim 5, wherein the glass base member further contains $Al_2O_3$ by 0.01 to 10 wt %.

7. The image display apparatus according to claim 5, wherein $Sb_2O_3$ is contained in an amount of 0.1 to 2 wt %.

8. The image display apparatus according to claim 5, wherein the glass base member has convex and concave shapes on a surface thereof.

* * * * *